United States Patent
Bolan et al.

[19]

[11] Patent Number: 6,021,494
[45] Date of Patent: *Feb. 1, 2000

[54] ELECTRONIC MICRO IDENTIFICATION CIRCUIT THAT IS INHERENTLY BONDED TO SOMEONE OR SOMETHING

[75] Inventors: Michael L. Bolan, Dallas; Nicholas Fekete, Richardson, both of Tex.

[73] Assignee: Dallas Semiconductor Corporation, Dallas, Tex.

[*] Notice: This patent is subject to a terminal disclaimer.

[21] Appl. No.: 09/048,368

[22] Filed: Mar. 26, 1998

Related U.S. Application Data

[63] Continuation of application No. 08/684,520, Jul. 19, 1996, Pat. No. 5,764,888.
[60] Provisional application No. 60/001,303, Jul. 20, 1995.
[51] Int. Cl.[7] ...................................................... G06F 11/34
[52] U.S. Cl. .............................................................. 713/200
[58] Field of Search .............................. 395/186, 187.01, 395/188.01; 364/186; 713/200, 201, 202

[56] References Cited

U.S. PATENT DOCUMENTS

| | | | |
|---|---|---|---|
| Re. 34,161 | 1/1993 | Nakagawa et al. | 463/29 |
| 5,210,846 | 5/1993 | Lee | 395/425 |
| 5,581,763 | 12/1996 | Hait | 395/186 |

FOREIGN PATENT DOCUMENTS

| | | |
|---|---|---|
| 0414 316 | 8/1990 | European Pat. Off. . |
| 2259852 | 10/1990 | European Pat. Off. . |
| 93 20 743 U | 2/1995 | Germany . |
| WO 88/09541 | 12/1988 | WIPO . |

*Primary Examiner*—Phung M. Chung
*Attorney, Agent, or Firm*—Jenkens & Gilchrist, P.C.

[57] ABSTRACT

This invention relates to a small portable microprocessor based circuit (electronic module) that contains information about the user of the circuit that is known or inherently known by the user. The circuit is small enough to fit inside a thickened U.S. nickel and enables a user to perform secure transactions such as money transfers, information transfers, access control, etc. The electronic module is designed to be extremely secure both physically and electronically. Furthermore, the electronic module is useless to a person other than the designated user.

16 Claims, 2 Drawing Sheets

ELECTRONIC MICRO IDENTIFICATION CIRCUIT THAT IS INHERENTLY BONDED TO SOMEONE OR SOMETHING

This application is a continuation of application Ser. No. 08/684,520, filed Jul. 19, 1996 now is U.S. Pat. No. 5,764,888 which is a provisional of application No. 60/001,303; filed on Jul. 20, 1995.

CROSS REFERENCE TO RELATED APPLICATIONS

This application is related to the following U.S. Patent Applications

| SERIAL NO. | TITLE | INVENTOR |
| --- | --- | --- |
| 20661-420 | MICROCIRCUIT WITH MEMORY THAT IS PROTECTED BY BOTH HARDWARE AND SOFTWARE | Little et al |
| 20661-423 | SINGLE CHIP MICROPROCESSOR, MATH CO-PROCESSOR, RANDOM NUMBER GENERATOR, REAL-TIME CLOCK AND RAM HAVING A ONE-WIRE INTERFACE | Little et al |
| 20661-432 | SECURE MODULE WITH MICROPROCESSOR AND CO-PROCESSOR | Little et al |
| 20661-421 | METHOD AND APPARATUS FOR ENCRYPTION KEY CREATION | Schweitzer et al |

All cross references are filed on even date herewith, assigned to the assignee of the present invention and hereby incorporated by reference as if reproduced in their entirety.

BACKGROUND OF THE INVENTION

1. Field of the Invention

This invention relates to a small portable microprocessor based circuit that contains information about the user of the circuit that is known or inherently known to the user. More particularly, the present invention relates to a portable microprocessor based circuit that is built into an articulatable article. The articulatable article is a personal possession of the user. The microprocessor based circuit provides the user with the capability to perform a vast variety of secured and unsecured transactions that the user may wish to participate in on a daily basis.

2. Description of the Related Art

As the world we live in becomes more complex and transactions between man and machines become more and more necessary, a vast variety of keys, access cards, and personal identification devices have been made available to the public. Access cards provide access to hotel rooms, secure storage areas, selected rooms or buildings, bank accounts, computer systems, etc. Access devices, as we know them today, tend to comprise a readable piece of information, such as the user's name and an identification number, and then require the user to type in the identification number in order to obtain access.

Also available in society today are credit and debit cards. These cards enable a user to perform a vast variety of transactions. Such transactions usually involve money or monetary equivalents.

A drawback of present-day keys, access cards, credit cards and the like, is that they are not secure enough. Counterfeiting and unauthorized access are a major problem for banking organizations, corporations and government entities. Furthermore, at present, if an access card or the like is lost by the user, the finder of the card can easily, in many cases make transactions with the access card (i.e., credit cards).

What is needed is a means for access that is both secure and inherently bonded to the user. Such a device will be extremely difficult to counterfeit (both the device and the transaction) and be worthless to anybody other than the designated user.

SUMMARY OF THE INVENTION

The present invention overcomes the drawbacks in the related art by providing a small portable data module having means for storing an identifying a piece of information inherently related to a designated user of the portable data module. The portable data module is physically constructed and programmed so that the identifying piece of information is erased if an unauthorized entry or access is performed on the data module.

The data module is preferably incorporated into a single integrated circuit that is mounted on a small circuit board. The integrated circuit has a microprocessor core, a memory circuit, a one wire UART, a math coprocessor, and a data bus which allows the to various circuits on the integrated circuit to communicate. The data module is preferably at least as small as a thick nickel. The data module can be incorporated into an articulatable accessory so that a user can easily carry the data module wherever he/she goes.

The data module incorporates a means for communicating bidirectionally over a single wire. The data module can communicate with a host system then thereby read or write an encrypted data from or to the data module. The data module is also adapted to compare an encrypted data received from a host with a stored data.

BRIEF DESCRIPTION OF THE DRAWINGS

A more complete understanding of the method and apparatus of the present invention may be had by reference to the following Detailed Description when taken in conjunction with the accompanying drawings wherein.

DETAILED DESCRIPTION OF THE EXEMPLARY EMBODIMENTS

Figure 1:
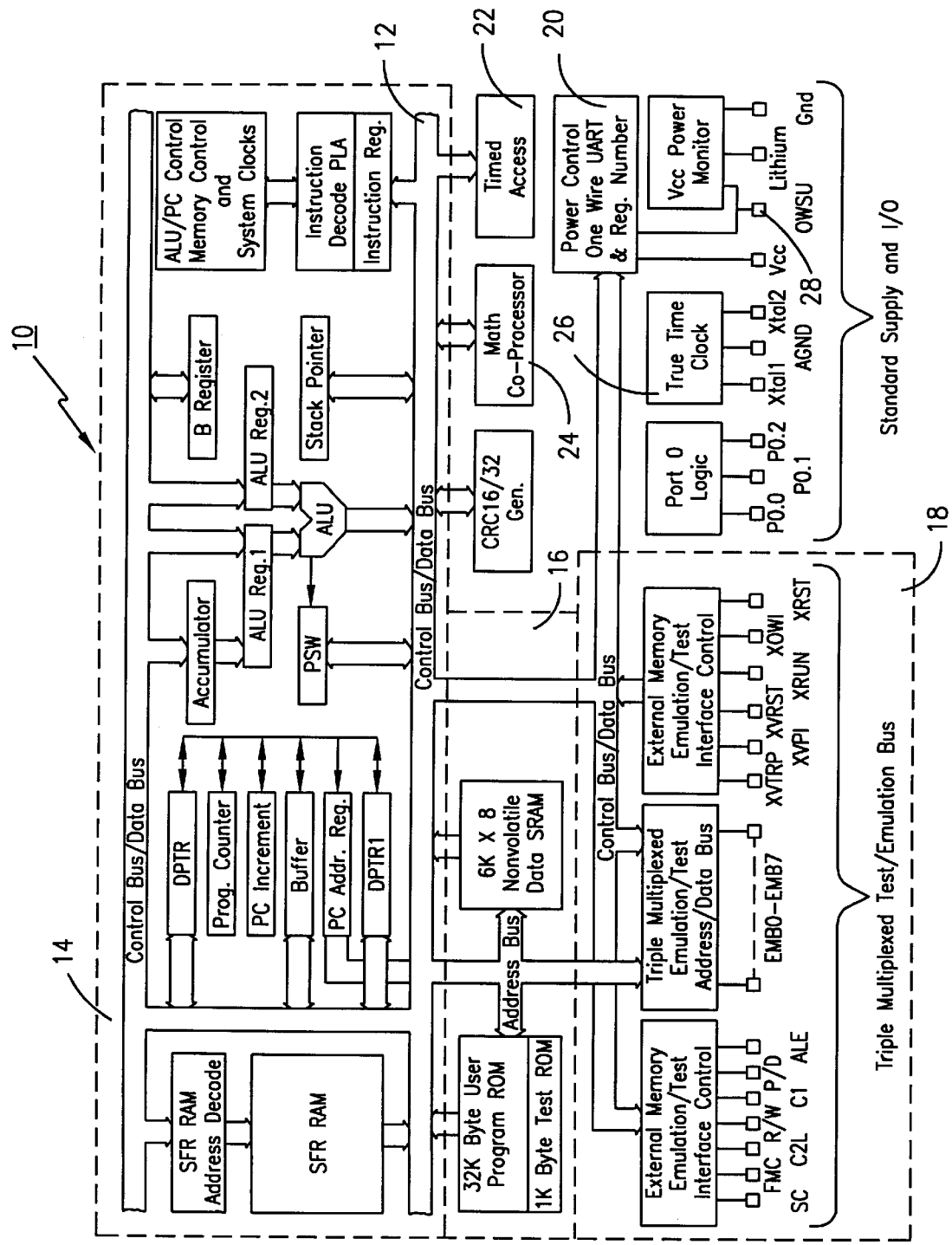
FIG. 1 depicts a block diagram of an exemplary data module.

An exemplary embodiment of the present invention is a microprocessor microcircuit built into an articulatable accessory which can be easily worn or carried by a human. Another exemplary embodiment of the present invention is a microelectronic circuit that contains knowledge about or some inherent information about the someone or something that is identified with the microelectronic circuit. The microprocessor is associated with a memory circuit which can be read from or written to when a single input/output node, associated with the microcircuit, is touched or passed near to a receptor. An exemplary embodiment can provide the owner a secure electronic identification signature and may be used by the owner for a variety of tasks which require identification. Such tasks include, but are not limited to banking transactions, entry into a predetermined locality, computer access and transmission or reception of information, debit/credit monetary transactions, postal metering, and encryption.

An exemplary embodiment of the micro identification if circuit can be used by touching a predetermined surface of the micro identification circuit to a small conductive reader surface associated with a host system. Another exemplary embodiment of the micro identification circuit can be used by passing the micro identification circuit near a host systems communication receptacle. The communication between the host system and the exemplary micro identification circuit is preferably via a one-wire interface and/or one-wire interface protocol.

The micro identification circuit may require a dual input in order to operate the task. For example, if an owner wishes to carry out an automated banking transaction, the micro identification circuit may 1) have to be touched or passed near to the automatic teller machine and receive a key from the automatic teller machine, and 2) the user may have to enter an identification indicia into the teller machine. The identification indicia can be an alphanumerical code, a digital image, a voice sound, a exhaled breath, etc. The micro identification circuit will interpret the identification indicia to determine that the user is the owner of or associated with the micro identification circuit. Thus, the micro identification circuit is bonded to a predetermined, particular individual.

The indicia should have a direct one-to-one relationship with the user/person/thing that is carrying or being identified by the micro identification circuit thereby bonding the micro identification circuit to the individual or thing. The indicia could be any personal information or statistic such as a personal ID number, password, fingerprint, medical information, etc.

Within the micro controller circuit is a microprocessor and a memory circuit. A digital identification number and the identification indicia are stored within the memory circuit.

The articulatable accessory into which the micro identification circuit is placed can be a variety of items worn or carried by an owner. For example the articulatable item can be a ring, bracelet, key chain, detachable pin, badge or broach, cufflink, or as part of a necklace. Odd contortions of the human body and modern styles are the only limits to what an articulatable accessory can be. An important aspect of the an exemplary embodiment of the present invention is that the micro identification circuit can communicate with a host circuit while the micro identification circuit is being worn, held or within the owner's physical possession. That is, the owner of the microcircuit does not have to give up possession of the circuit while the circuit communicates with a host system.

With prior identification circuits, bank cards, etc., the bank card must be taken into a machine and held within the machine in a predetermined position while data is being read from or written to the card. That is, the link between the host and the prior art identification circuits could not be broken while data reads or transfers are occurring. The present invention incorporates one-touch circuitry, or no-touch circuitry which can be interrupted (i.e. the electrical connection can be temporarily broken between the micro circuit and the host) without data loss or bad-consequences because of buffered scratch pad circuitry within the micro identification circuit. Thus, for any read and write transaction associated with the present micro identification circuit the user can always hold or maintain some sort of physical possession of the micro identification circuit. That is, the user and the micro identification circuit are not required to be physically separated.

The microelectronic circuit preferably includes a microprocessor, memory, and one-wire interface circuitry. Within the memory is contained identification information which will positively identify only one individual as being the owner of the microcircuit. The identification can be as simple as an alphanumeric code or can be more complex to include physical, mental or biological characteristics of the owner. Thus, only the owner, in combination with the microcircuit, can obtain access to a host system associated with the microcircuit.

Preferably the microcircuit includes a microprocessor associated with a one-wire interface similar to those manufactured by Dallas Semiconductor, Inc., but any reasonable facsimile or similar device will suffice.

Referring to FIG. 1, a block diagram of an exemplary microcircuit 10 is depicted. The exemplary microcircuit 10 is divided into a few large blocks which are interconnected via a data bus 12. The blocks include a microprocessor core 14, memory (ROM and RAM) 16, an emulation and test interface 18, power monitor 20, one wire UART 22, math coprocessor 24, and a real time clock The one wire UART 22 is adapted to communicate in a bidirectional manner over a single wire bus 28 (one wire bus). Preferably, the UART 22 will operate via a one-wire protocol created by Dallas Semiconductor. The UART 22 can be designed to operate via a touchless system which uses infrared, electromagnetic waves, or magnetic forms of communication.

The UART 22 may incorporate an identification code to uniquely identify the microcircuit 10.

A math coprocessor 24 is incorporated into the microcircuit 10 to handle mathematic based encryption such as RSA encryption. The exemplary microcircuit may have the capability to create and store encryption key pairs in its memory 16. The math coprocessor 24 is used to aid the creation of encryption keys and to encrypt and decrypt data and information communicated over the single wire bus 28.

The memory 16 has at least two distinct portions. One being program memory and the other being data memory. The data memory is preferably SRAM so that it can be erased in a single clock cycle if an unauthorized entry into the electronic module 10 is made. Thus, the SRAM is part of the security of the electronic module 10.

Figure 2:
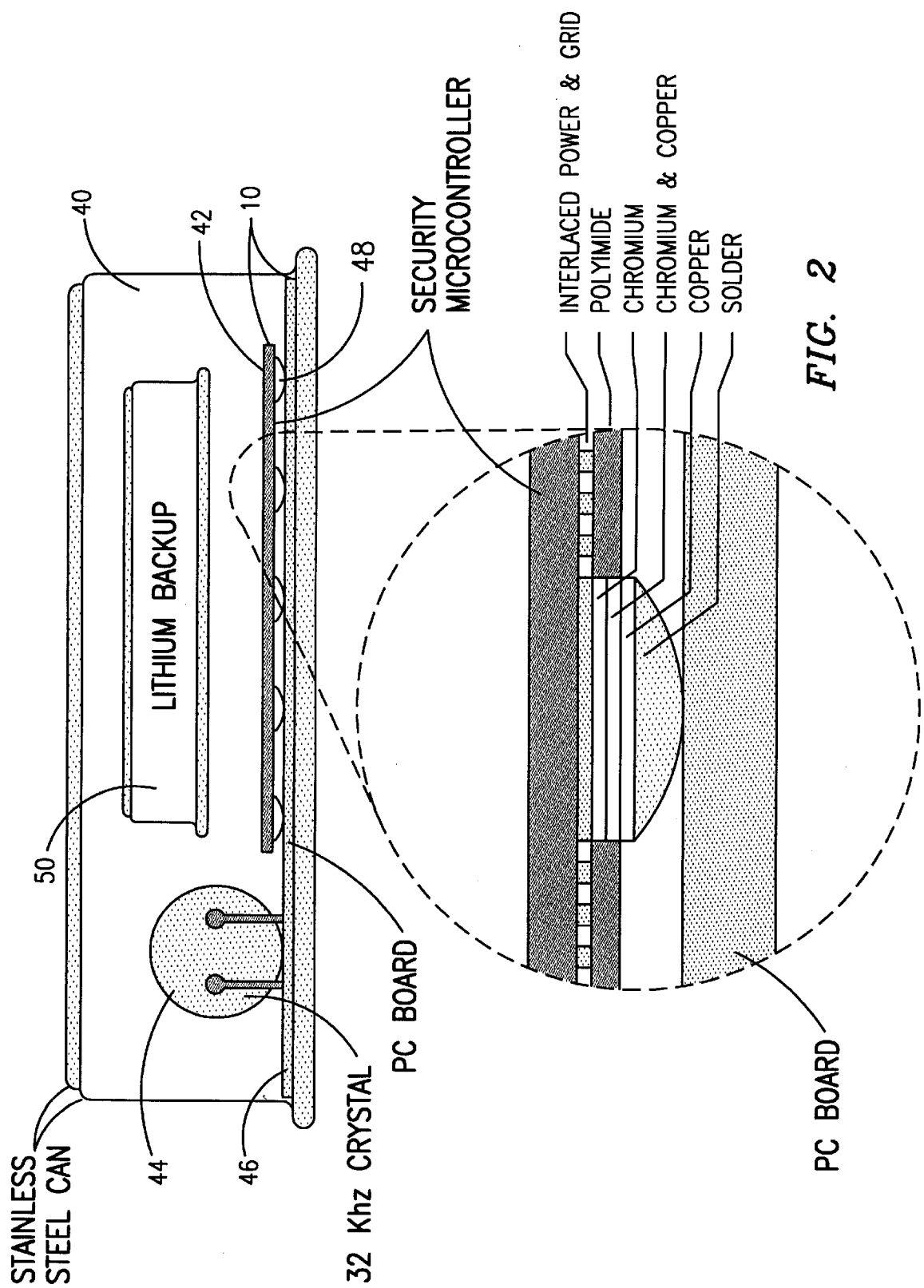
FIG. 2 depicts an exemplary data module incorporated into an exemplary articulatable accessory (i.e., a metal token shaped canister).

Referring to FIG. 2, and exemplary electronic 10 module can be incorporated into a token size carrier 40. Here the carrier 40 is a stainless steel can that looks similar to a watch battery. The electronic module 10, which preferably includes an integrated circuit 42 and a crystal oscillator 44 and potentially some other minor electronic components (i.e., power source, capacitor) are mounted on and comprised with a circuit card 46 which fits within the container 40. The integrated circuit 42 is solder bumped 48 and installed with the doped side of the integrated circuit 42 facing the circuit card 46. The use of solder bump technology further enhances the secure aspects of the present electronic module 10. It is understood that the present electronic module 10 can be mounted in a vast variety of objects such as those described earlier in this application.

A power source such as a battery 50 may be installed with the electronic module to backup the SRAM memory. The battery is preferably a lithium battery but could be any type of battery, charged capacitor, solar cell system, or power connection.

The electronic module 10 is designed and programmed to be both secure (package wise and communication wise) and to be only usable by the assigned user. The packaging of the electronic module 10 is secure via a variety of physical and electronic barriers. Such barriers include, but are not limited to 1) having a temperature window of operation; 2) interlaced power and ground lattice; 3) solder bump/flip-chip technologies; 4) module tampering alarm circuitry; 5) SRAM destruction circuitry on tampering of the electronic module; 6) RSA encryption capabilities for bidirectional communication. Thus, the electronic module is extremely difficult to copy, counterfeit, or to decipher its communications.

Furthermore, the electronic module 10 is inherently bonded to a specific individual by containing data or information that is only known or in the possession of the user. The data cannot be read or retrieved from the data module. Thus, only the designated user can use the electronic module. If the module is acquired by an unauthorized person, that unauthorized person cannot use the electronic module 10 because he is not in possession of the data or information that is known or in possession of the authorized user. If the unauthorized user attempts to obtain the data from the electronic module 10, then the module is designed to destroy the memory portion of its circuitry thereby rendering the module useless.

As is clearly seen, the present invention is a significant invention in the art. The present invention is believed to be especially effective when configured and employed as described herein, however, those skilled in the art will readily recognize that numerous variations and substitutions may be made in the invention and its use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A secure microprocessor based portable data carrier, comprising:

a storage location for storing information inherently related to a designated user;

protection circuitry for protecting said information so that an attempt to read said storage location in an unauthorized manner will disable said data carrier.

2. The data carrier of claim 1, wherein said storage location comprises an SRAM memory.

3. The data carrier of claim 2, wherein said data carrier can be incorporated into an articulatable accessory.

4. The data carrier of claim 3, wherein said articulatable accessory is at least one of a can, a ring, a bracelet, a key chain, a detachable pin, a badge, a broach a cufflink a necklace, a wallet, a purse, a writing instrument, a credit card, a smart card, and a card.

5. The data carrier of claim 1, wherein said protection circuitry comprises a temperature sensing circuit for determining whether the data carrier is operating in an environment outside of a predetermined temperature range.

6. The data carrier of claim 1, wherein said protection circuitry comprises an interlaced power and ground lattice.

7. The data carrier of claim 1, wherein said protection circuitry comprises solder bump/flip chip technology.

8. The data carrier of claim 1, wherein said protection circuitry comprises module tampering alarm circuitry.

9. The data carrier of claim 1, wherein said protection circuitry comprises timed access control circuitry.

10. The data carrier of claim 1, wherein said storage location can be erased in a single clock cycle by said protection circuitry.

11. The data carrier of claim 1, wherein said information is only known by said designated user.

12. A secure microprocessor based portable data carrier, comprising:

a storage location for storing information inherently related to a designated user;

protection circuitry for protecting said information so that an attempt to read said storage location in an unauthorized manner will erase said storage location.

13. An electronic microprocessor based identification circuit that is inherently bonded to a person, comprising:

a memory location for storing information inherently bonded to said person;

protection circuitry for protecting said information;

circuitry for communicating with a host in order to receive a user inputted information and to compare said user inputted information with said stored information.

14. The electronic microprocessor based identification circuit that is inherently bonded to a person of claim 13, wherein said protection circuitry receives a signal due to tampering with a physical barrier.

15. The electronic microprocessor based identification circuit that is inherently bonded to a person of claim 13, wherein said protection circuitry receives a signal from an electronic barrier circuit.

16. The electronic microprocessor based identification circuit that is inherently bonded to a person of claim 13, wherein said protection circuitry erases said memory circuit if a signal is received by said protection circuitry indicating that said identification circuitry is being tampered with.

* * * * *